Jan. 21, 1936. M. E. GLUHAREFF 2,028,542
WINDSHIELD CONSTRUCTION
Filed Aug. 26, 1932
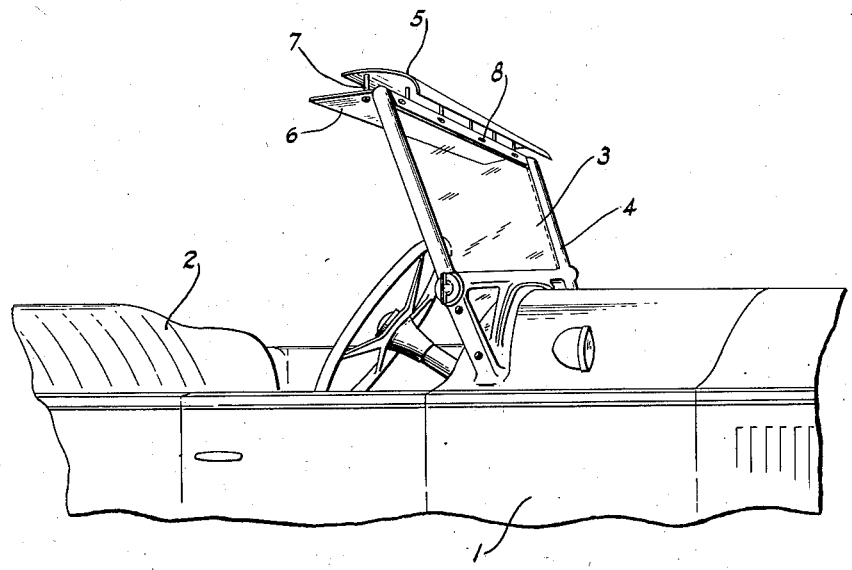
INVENTOR
Michael E. Gluhareff
BY
Harris G. Luther
ATTORNEY Patented Jan. 21, 1936

2,028,542

UNITED STATES PATENT OFFICE

2,028,542

WINDSHIELD CONSTRUCTION

Michael E. Gluhareff, Stratford, Conn., assignor, by mesne assignments, to United Aircraft Corporation, a corporation of Delaware Application August 26, 1932, Serial No. 630,607

9 Claims. (Cl. 296—84)

This invention relates to an improvement in wind shield construction.

It has been found that the occupants of rapidly moving vehicles having open cockpits, such as an automobile without any top or covering over the seat, have been subjected to considerable annoyance and discomfort as a result of air currents. Wind shields have sometimes been provided to deflect these air currents and thus protect the occupants of the vehicle, but these wind shields have often induced back drafts or eddy currents which cause discomfort to the vehicle occupants.

An object of this invention is to provide means for directing air currents adjacent moving objects so as to reduce or avoid induced eddy currents.

Further and other objects and advantages will be apparent from the specification and claims and from the accompanying drawing which illustrates what is now considered the preferred embodiment.

The figure of the drawing illustrates my invention applied to the wind shield of an automobile.

By the use of this device, in conjunction with the wind shield of an automobile, the formation of annoying eddy currents is prevented and the air which would normally form these eddy currents is directed in a smooth path above the occupant of the vehicle. The area behind the wind shield remains in relatively still air, and the occupant of the vehicle being in this area is not subjected to annoying air currents. Water, snow, or dust particles are carried along with the smooth air flow above the occupant, so that it is possible to drive a machine having an open cockpit and equipped with this device without discomfort even in rainy weather.

In the embodiment illustrated in the drawing 1 indicates the vehicle body in general and 2 indicates the seat for the occupants. A wind shield 3 is supported upon the body of the car by the frame 4. A plate or airfoil 5 of any suitable shape is secured adjacent a top edge of the wind shield. This plate is spaced from the wind shield so that there is an air passage between the upper edge of the wind shield and the plate. This plate is also positioned so that it projects in front of and behind the wind shield. Air flowing along the wind shield or air endeavoring to flow across the upper edge of the wind shield contacts with this plate and is directed thereby in a smooth path approximately parallel to the direction of the travel of the vehicle. An additional plate 6 may be used, if desired, to assist in directing the air flow. In the embodiment illustrated in the drawing, the plate 6 is a flat plate secured by fastening means 8 at its leading edge to the upper edge of the wind shield and projecting rearwardly therefrom. This plate cooperates with the first mentioned plate 5 to produce a passageway between the plates, which passageway assists in controlling the direction of the flow of air and conducting it past the edge of the wind shield without the formation of eddy currents.

The plate 6 supports the plate 5 by means of spacers and a fastening means 7. These fastening means serve to hold the plate or airfoil 5 in the desired position relative to the wind shield and also serve to space the plates 5 and 6 the desired distance from each other.

The operation of this device is as follows:

Air flowing along the body 1 of the vehicle is deflected upwardly by the wind shield 3. The direction of this air current is changed by the plates 5 and 6 so that it is again directed in a substantially horizontal path and at an appreciable distance above the heads of the occupants of the area behind the wind shield. By so directing the air, a smooth flow is obtained and the formation of eddy currents is prevented. Any particles, such as dust or water, are carried along with the directed air stream at such a velocity that they do not drop into the area behind the wind shield, and thus permit driving without discomfort even during a rain storm.

While this device has been shown only as applied to the top of the wind shield of an automobile, it will be obvious that it can be applied to the sides as well, or in the many other places where it might be desired to reduce eddy currents or direct the flow of air around a moving object. This device may, of course, be made of any suitable material and may be transparent, translucent, or opaque as desired.

It is therefore to be understood that the invention is not limited to the specific embodiment herein illustrated and described, but may be used in other ways without departure from its spirit as defined by the following claims.

I claim:

1. In a motor vehicle, in combination, an uncovered compartment, a wind shield adjacent said compartment, a flat plate secured adjacent its leading edge, adjacent the top of said wind shield and projecting rearwardly therefrom, a curved plate projecting forwardly and rearwardly of said wind shield and adjacent to and spaced from said first mentioned plate, and arranged to form a slot for the passage of air between the plates whereby upon relative movement of the wind shield and the adjacent air, air is directed past the wind shield in a substantially smooth path.

2. Means for directing the flow of air comprising in combination a flat plate and a curved plate, said curved plate spaced from said flat plate with its concave side toward the flat plate, the leading edge of said curved plate in advance of the leading edge of said flat plate and the trailing edge of said curved plate in advance of the trailing edge of said flat plate.

3. A body having an open compartment, a wind shield projecting above said compartment at the forward end thereof, means for creating a substantially dead air space in the area behind said wind shield during relative motion of air and the wind shield comprising means for controlling the flow of air passing the wind shield edge and directing such airflow in a substantially smooth path past said open compartment, said air controlling and directing means comprising a pair of plates, the forward end of one of which is secured adjacent the wind shield, each said plate extending rearwardly in a direction substantially parallel to the directed air flow, the other plate comprising a curved sheet spaced from said first mentioned plate and having its concave side toward the wind shield, said curved plate extending in front of said wind shield, and curved from a direction substantially parallel to the wind shield to a direction substantially parallel to the directed air flow.

4. In a motor vehicle, a compartment adapted to contain a person, said compartment being open at the top and of such height that the occupant's head is normally above the edge thereof, a wind shield adjacent the forward edge of said compartment and means adjacent the wind shield edge adapted to direct air from the front of said wind shield and discharge it at the rear thereof in a comparatively smooth stream directed past the open compartment and removed from the occupant's head, said means comprising a plate secured at its leading edge adjacent the top edge of the wind shield and extending rearwardly therefrom, another plate of curved cross-section extending forwardly and rearwardly of the wind shield arranged above and spaced from said first mentioned plate and having its concave side toward said first mentioned plate.

5. In a vehicle, in combination, a wind shield extending above the body of said vehicle, an open compartment back of said wind shield and means for directing the flow of air past said wind shield and over said compartment, said means comprising a substantially flat plate and a curved plate, said flat plate arranged adjacent an edge of said wind shield and extending rearwardly therefrom, said curved plate spaced from said flat plate with its concave side toward the flat plate, the leading edge of said curved plate being in advance of the leading edge of said flat plate.

6. Means for reducing the disturbance in the area behind an obstacle created by relative movement of said obstacle and the surrounding air comprising, in combination, a substantially flat plate arranged with its leading edge adjacent an edge of the obstacle and with the plate extending rearwardly from said obstacle and an airfoil comprising a curved plate arranged adjacent said flat plate and with its concave side toward said flat plate and with the leading edge of said curved plate in advance of the leading edge of said flat plate, said plate and said airfoil adapted to direct the air flow in a smooth substantially unbroken path past the edge of said obstacle.

7. In a motor vehicle, in combination, an uncovered compartment, a wind shield adjacent to said compartment, a flat plate secured at its leading edge to the top edge of said wind shield and projecting rearwardly therefrom, a second plate projecting forwardly and rearwardly of said wind shield and adjacent to and spaced from said first mentioned plate, and arranged to form a slot for the passage of air between the plates, whereby upon relative movement of the wind shield and the adjacent air air is directed past the wind shield in a substantially smooth path.

8. In combination with a wind shield, means for reducing the disturbance in the area behind the wind shield caused by relative movement of the wind shield and the surrounding air, comprising a substantially flat plate and a curved plate adjacent the wind shield edge and arranged to form a slot for the passage of air, said plates and said slot cooperating to direct air from the front to the rear of the wind shield and past the edge thereof in a substantially smooth path.

9. In combination with a wind shield, means for reducing the disturbance in the area behind the wind shield caused by relative movement of the wind shield and the surrounding air, comprising a substantially flat plate secured adjacent to the wind shield and a curved plate secured to the flat plate to form a slot for the passage of air, said plates and said slot cooperating to direct air from the front to the rear of the wind shield and past the edge thereof in a substantially smooth path.

MICHAEL E. GLUHAREFF.